F. M. BUSCHOR.
RESILIENT WHEEL.
APPLICATION FILED MAY 4, 1918.
1,324,726.
Patented Dec. 9, 1919.
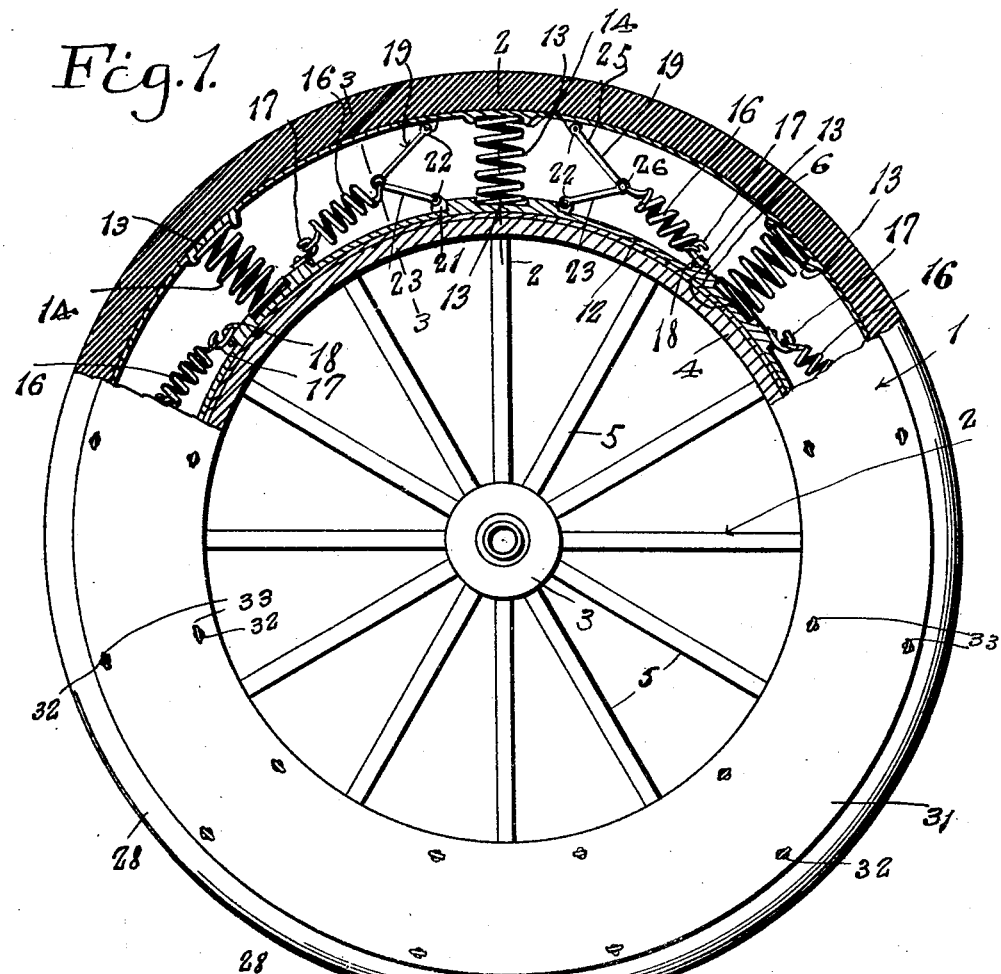
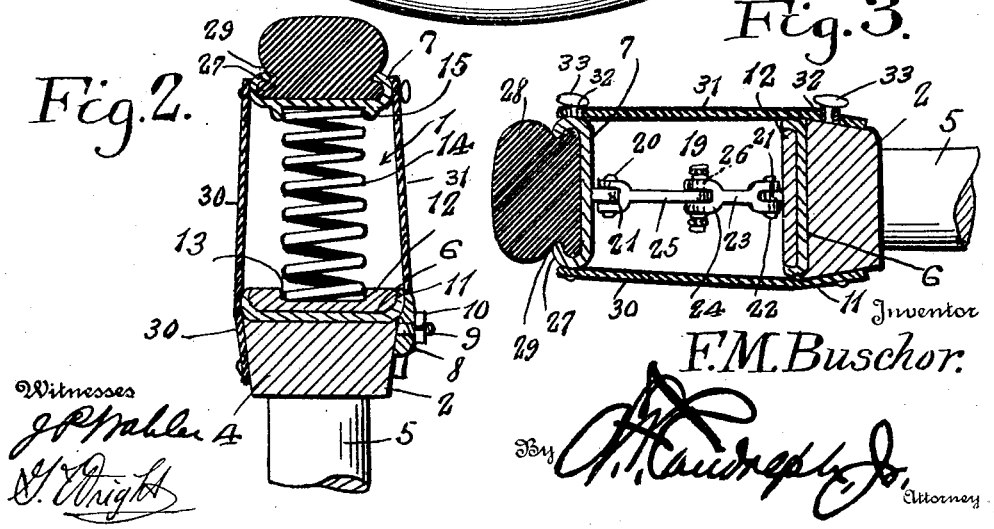
F. M. Buschor.

UNITED STATES PATENT OFFICE.

FRANK M. BUSCHOR, OF COLDWATER, OHIO.

RESILIENT WHEEL.

1,324,726. Specification of Letters Patent. Patented Dec. 9, 1919.

Application filed May 4, 1918. Serial No. 232,553.

*To all whom it may concern:*

Be it known that I, FRANK M. BUSCHOR, a citizen of the United States, residing at Coldwater, in the county of Mercer and State of Ohio, have invented certain new and useful Improvements in Resilient Wheels; and I do hereby declare the following to be a full, clear, and exact description of the invention, such as will enable others skilled in the art to which it appertains to make and use the same.

This invention relates to vehicle wheels, and more particularly to wheels for motor vehicles and the primary object of the invention is to provide an improved wheel having a resilient tire detachably secured thereon, in which the shocks of the road are absorbed by a plurality of springs, thereby eliminating the usual pneumatic tires, and thus eliminating the inconveniences usually associated therewith.

Another object of the invention is to provide an improved resilient tire, in which the springs are so positioned in the same, that the weight of the vehicle is equally distributed throughout the entire tire, so as to prevent distortion of any one of the springs.

A further object of the invention is to provide a resilient rim for a vehicle tire, in which a plurality of hinged levers are positioned intermediate the shock absorbing springs, so as to prevent the lateral movement and twisting of the outer rim of the tire.

A still further object of the invention is to provide a resilient tire including inner and outer spaced annular rims, having a plurality of radially extending shock absorbing springs, a hinged lever positioned intermediate the springs to prevent lateral movement and side twists of the outer rim, and having a contractile coil spring connected to the lever and to the inner rim, to normally hold the levers in operative position and to distribute the weight of an automobile vehicle throughout the entire tire.

A still further object of the invention is to provide an improved resilient tire of the above character which is durable and efficient in use, one that is simple and easy to manufacture, and one which can be placed upon the market at a reasonable cost.

With these and other objects in view, the invention consists in the novel construction, arrangement and formation of parts, as will be hereinafter more specifically described, claimed and illustrated in the accompanying drawing, forming a part thereof in which:

Figure 1 is an elevation partly in section of the improved resilient tire, showing the same positioned on a vehicle wheel, Fig. 2 is a detail section taken on the line 2—2 of Fig. 1, and Fig. 3 is a transverse section taken on the line 3—3 of Fig. 1.

Referring to the drawings in detail, wherein similar reference numerals designate corresponding parts throughout the several views, the numeral 1 generally indicates the improved resilient tire positioned on a wheel 2. The vehicle wheel 2 is of the ordinary or any preferred construction and consists of a hub 3, a felly 4 and the connecting spokes 5.

The resilient tire 1 includes an inner and an outer rim 6 and 7. The rim 6 is secured to the felly 4 in any suitable manner, so that the same can be removed when desired, and is held in place by the removable annular plate 8 held by nuts 9, which are fitted on bolts 10 carried by the felly 4. The rim 6 has its side edges bent outwardly as at 11 to provide flanges, for receiving an annular plate 12, which has a plurality of pockets 13 formed upon its outer surface at spaced points for receiving the heavy coil springs 14. The outer rim 7 is provided with a plurality of circular sockets 15 at equal distance spaced points for receiving the outer ends of the coil springs 14. The coil springs 14 form means for absorbing the shock of the road over which the vehicle is traveling, and to distribute the weight of the vehicle throughout the springs and the tire, additional springs 16 are provided. The springs 16 are of the tractile type, and have one end of the same secured to hooks 17, which are bolted as at 18 to the plate 12 and have their outer ends secured to a pair of levers 19, of the knuckle joint type. The levers 19 have their outer ends bifurcated as at 20 to receive lugs 21 carried by the plate 12 and the inner surface of the outer rim 7. Suitable pivot pins 22 hold the outer ends of the lever pivotally connected to inner rim 12 and the outer rim 7. The inner ends of the levers are pivotally connected together and the inner lever 23 has its outer end bifurcated as at 24 to receive the inner ends of the outer lever 25. A suitable pivot pin 26 extends through the same to pivotally hold the same together. The outer end of the spring 16 is connected to the levers 23 and 25 at the pivotal point of the same. The levers form an effective means for preventing side twists of the outer rims 7 and prevents distortion of the same. The spring 16 holds the levers in operative position and form means for equally distributing the load on the tires throughout the same.

The outer rim 7 has its side edges bent outwardly and inwardly to provide clencher flanges 27 for receiving a solid rubber tire 28, which has the side beads thereof mounted in the annular groove 29 formed by the flanges 27.

A protecting cover 30 is provided for preventing dust, grit and the like from entering into the tire and thus impair the efficiency of the same. And this covering is formed from any suitable flexible material, such as canvas, rubber or the like. The covering is formed so as to extend from the outer rim to the felly of the wheel and one portion is permanently secured in place by any suitable means, and the other section 31 is removably secured in position and is provided at spaced points with apertures 32, to receive buttons 33 carried by the outer rim 7 and the felly 4.

From the foregoing description it can be seen that an improved resilient spring tire has been provided, which will effectively absorb all shock and prevent lateral and twisting movement of the tire in relation to the wheel.

In practice, I have found that the form of my invention, illustrated in the accompanying drawings and referred to in the above description, as the preferred embodiments, is the most efficient and practical; yet realizing the conditions concurrent with the adoption of my device will necessarily vary, I desire to emphasize the fact that various minor changes in detail of construction, proportion and arrangement of parts may be resorted to, when required, without sacrificing any of the advantages of my invention as set forth.

What I claim as new is:

In a resilient tire, a pair of spaced rims, coil springs connecting the rims together, pairs of oppositely disposed levers arranged on each side of the coil springs, said levers each including pivotally connected sections, means pivotally connecting the outer ends of the sections to the rims, inclined contractile coil springs connected to the inner rim and to the levers at the pivotal point of the sections and extending in opposite directions, as and for the purpose specified.

In testimony whereof I affix my signature in presence of two witnesses.

FRANK M. BUSCHOR.

Witnesses:
ALOIS P. LINK.
JOHN H. BOEKE.